United States Patent [19]

Lynch

[11] Patent Number: 5,198,901
[45] Date of Patent: Mar. 30, 1993

[54] DERIVATION AND USE OF MOTION VECTORS IN A DIFFERENTIAL PULSE CODE MODULATION SYSTEM

[75] Inventor: William E. Lynch, Ancaster, Canada

[73] Assignee: Matsushita Electric Corporation of America, Secaucus, N.J.

[21] Appl. No.: 764,187

[22] Filed: Sep. 23, 1991

[51] Int. Cl.[5] .............................................. H04N 7/13
[52] U.S. Cl. .................................... 358/136; 358/105
[58] Field of Search ................ 358/105, 136, 133, 135

[56] References Cited

U.S. PATENT DOCUMENTS

| | | | |
|---|---|---|---|
| 4,985,768 | 1/1991 | Sugiyama | 358/136 |
| 4,999,705 | 3/1991 | Puri | 358/136 |
| 5,089,889 | 2/1992 | Sugiyama | 358/136 X |
| 5,103,307 | 4/1992 | Sugiyama | 358/136 |

OTHER PUBLICATIONS

"MPEG Video Simulation Mode Three (SM3)", source: *Simulation Model Editiorial Group, Jul. 25, 1990.*
"Advanced Digital Television–System Description" by The Advanced Television Research Consortium: David Sarnoff Research Center, NBC, N. American Philips, Thomson Consumer Electronics, Feb. 27, 1991.
"Video Coding with Motion–Compensated Interpolation for CD–ROM Applications", A. Puri et al., *Signal Processing: Image Communication 2* (1990) pp. 127–144.
"On Comparing Motion-Interpolation Structures for Video Coding", A. Puri et al., *Visual Communications and Image Processing 1990*, SPIE vol. 1360, pp. 1560–1571.
"Moving Picture Coding System for Digital Storage Media Using Hybrid Coding", A. Nagata et al., *Signal Processing: Image Communication* (1990) pp. 109–116.

*Primary Examiner*—Victor R. Kostak
*Attorney, Agent, or Firm*—Ratner & Prestia

[57] ABSTRACT

A differential pulse code modulation system having bidirectional motion estimation for blocks in bidirectionally-predicted frames, B frames, that is derived from the motion vector of a block in an anchor frame whose projection along its motion vector has the most overlap with the block in the B frame for which a motion estimation is sought.

9 Claims, 17 Drawing Sheets

DERIVATION AND USE OF MOTION VECTORS IN A DIFFERENTIAL PULSE CODE MODULATION SYSTEM

BACKGROUND OF THE INVENTION

In a Differential Pulse Code Modulation (DPCM) system referred to as Independent Search, IS, that has been suggested by the Moving Picture Experts Group and described in articles 1, 2 and 3, identified at the end of the specification that are hereby incorporated by reference, three types of frames are used as illustrated in FIG. 1. The letters indicate the type of frame, and the numerical subscripts indicate the order of occurrence of the frames at the input to the system. $I_0$ and $I_9$ are called intraframes. Each of these interframes is encoded by using only pixels within the frame. The encoded frames are then transmitted.

A predicted frame such as $P_3$ is encoded from $I_0$ in the following manner. $P_3$ is partitioned into identical blocks, e.g. having eight pixels in a side, that are called motion blocks. For each motion block in $P_3$, a search is made in the $I_0$ frame for a block of the same shape and size that matches the motion block. When the matching block is located, its position relative to the motion block is indicated by a motion vector (mv) representing the number of pixels left or right and the number of pixels up or down from the motion block to the matching block. These motion vectors are transmitted. Also, the differences between the motion blocks and corresponding matching blocks are formed. This is called residue, and it is encoded and transmitted. At the decoder, the $I_0$ frame is decoded and the predicted frame $P_3$ is formed by displacing appropriate matching blocks in $I_0$ using the motion vectors. The residue for the various blocks is then added. The frame $P_6$ is encoded in like manner from $P_3$. When a number of P frames have been encoded from preceding P frames in this manner, the accumulative error may become so great that another I frame is sent as described, and a new series of P frames is formed from it. The I and P frames are called anchor frames.

The B frames occur between anchor frames, and the motion vectors used in encoding them are illustrated in FIG. 2. The first numeral in a subscript of a motion vector mv indicates the frame in which a motion block is located and the second numeral indicates the frame being searched for a matching block. Thus, in encoding the frame $P_3$ as noted above, $mv_{30}$ is a motion vector indicating the position of a block in $I_0$ that matches a motion block in frame $P_3$ and $mv_{63}$ is a motion vector indicating the position of a block in $P_3$ that matches a motion block in $P_6$.

For each motion block in a B frame, two motion vectors are derived, one referenced to a subsequent anchor frame and one anchor referenced to a previous anchor frame. Thus, $mv_{23}$ indicates the position of a matching block in $P_3$ relative to a motion block in $B_2$ and $mv_{20}$ indicates the position of a matching block in $I_0$ relative to a motion block in $B_2$. What to transmit to the decoder can be determined by finding for each block which of the following modes of operation produces the least Mean Square Error (MSE) as this will reduce the bit rate required. For each motion block, the MSE is calculated by adding the squares of the differences between the corresponding pixels of the motion block and the matching block and dividing the result by the number of pixels in the motion block. In what is called a backward mode, the MSE is calculated between the motion block in $B_2$ and the matching block in $P_3$, and in a forward mode, the MSE calculation is done with the matching block being in $I_0$. In what is called an interpolative mode, the matching blocks in $P_3$ and $I_0$ are averaged, and the MSE is calculated with this averaged matching block. Whichever mode produces the least MSE is conveyed to the decoder. Thus, if the backward mode produces the least MSE, a motion vector $mv_{23}$ is transmitted along with an indication that it is the backward vector, and if the forward mode produces the least MSE, a motion vector $mv_{20}$ is transmitted along with an indication that it is the forward vector. If the interpolative mode produces the least MSE, both vectors $mv_{23}$ and $mv_{20}$ are transmitted along with an indication that both vectors are being transmitted. Of course, for the selected mode, the residue obtained by subtracting the matching block from the motion block is also encoded and transmitted.

FIG. 1 shows the various frames in the order that they are received by the encoder and presented to the viewer, and FIG. 3 illustrates the order in which the frames of FIG. 1 are processed. Both $P_{-3}$ and $I_0$ must be available before $B_{-2}$ and $B_{-1}$ can be processed as described above, and $I_0$ must be retained in memory until $P_3$ is available before $B_1$ and $B_2$ can be processed. The frame order of FIG. 3 is also the order in which the frames are transmitted.

In summary, transmission must include the $I_0$ frames, the P to I frame motion vectors such as $mv_{30}$, the residue for predicted frames such as $P_3$, the residue for each B frame that results from the selected mode of operation and at least one motion vector for each B frame along with signals indicating the mode of operation that has been selected. How a decoder can reconstruct the frames from this information is thought to be obvious.

In article 4, which is incorporated herein by reference, a differential pulse code modulation system is described that is like the IS system described above except for the fact that the motion vectors for the B frames are derived from motion vectors such as $mv_{30}$ or $mv_{63}$ of FIG. 2 that indicate the relative position of a block in an anchor frame that matches a block in the next anchor frame. The motion vector selected for a motion block in a B frame is the motion vector for a block in the later anchor frame that is in the same spatial position. If linear motion is assumed, a motion vector $mv_{20}(i, j)$ would equal $\frac{2}{3}mv_{30}(i, j)$ and $mv_{23}(i, j)$ would equal $-\frac{1}{3}mv_{30}(i, j)$. While this method has the advantage of not transmitting motion vectors for the B frames, the motion vectors that are used require the transmission of a significant amount of residue in most cases.

In article 5, which is incorporated herein by reference, the blocks in the earlier and later anchor frames that are at the ends of a vector such as $mv_{30}$ or $mv_{63}$ that pass through a block in a B frame are averaged to produce the data in that block. Although this method does not require the transmission of motion vectors for the B frames, it suffers from gap and overlap problems.

BRIEF DESCRIPTION OF THE INVENTION

In accordance with this invention, motion vectors for a block in a B frame are derived from the motion vector for a motion block in the following anchor frame whose projection along its motion vector to the previous anchor frame has the most overlap with that block. Thus, it is not necessary, as in the IS system, to find matching blocks in subsequent and previous anchor frames so as to find motion vectors such as $mv_{20}$ and $mv_{23}$ of FIG. 4. Instead, the motion vectors for a motion block in a $B_2$ frame are $mv_{20}$ (i, j)=$\frac{2}{3}mv_{30}$ (k, l) and $m_{23}$ (i, j)=$-\frac{1}{3}mv_{30}$ (k, l), where k and l are selected, as explained in the description of FIG. 4. Once these B frame motion vectors are derived, they can be used at the encoder in the various modes discussed in connection with the IS system to determine which mode produces the least residue. It is then only necessary to transmit the mode rather than the motion vectors.

Whereas the motion vector for the later anchor frame is expressed in integral numbers of pixel spacing, the motion vector for a block in a B frame may be expressed in terms of fractions of pixel spacings. This is because the motion vector for a B frame is a fraction of the motion vector for a P frame. Where two B frames $B_1$ and $B_2$ are used as in the drawings, the resolution of the shorter motion vectors for B frame motion blocks is $\frac{1}{3}$ of a pixel spacing and that for the longer motion vector is $\frac{2}{3}$ of a pixel spacing. Therefore, when these motion vectors are used in reconstructing a frame from pixels and interpolation is used, a better image can be formed. In order to obtain an independent motion vector with $\frac{1}{3}$ pixel resolution for a motion block in the $B_2$ frame, nine times as many locations in each of the $I_0$ and $P_3$ frames would have to be examined.

The major advantages of deriving the motion vectors for the B frame from the P frame vectors in accordance with this invention lie in the fact that in most situations less residue is produced than in the IS system and no motion vectors for the B frames need to be sent. As in an IS system, a signal indicating mode has to be sent, but it requires significantly fewer bits than a motion vector.

DETAILED DESCRIPTION OF THE INVENTION

Figure 4:
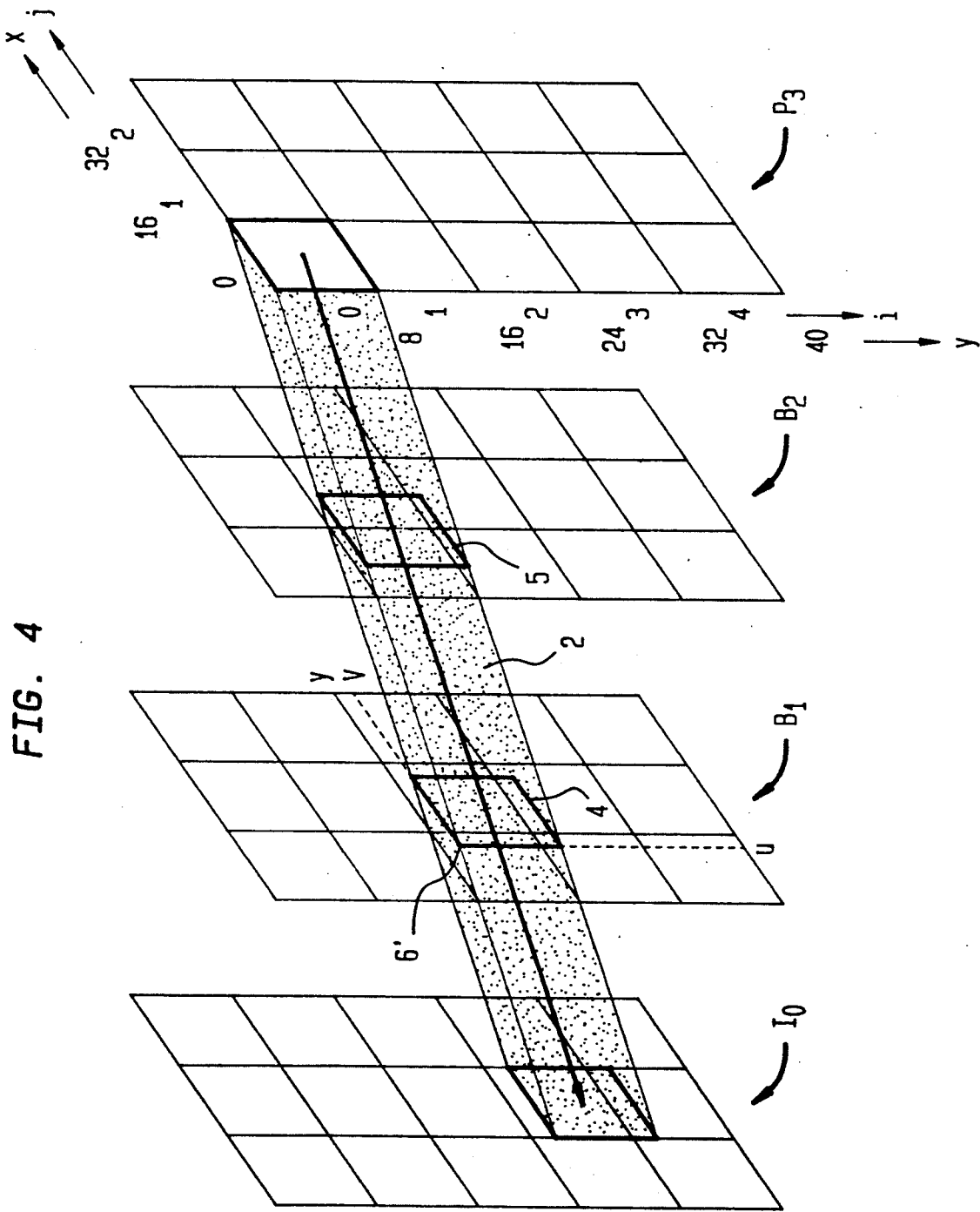
FIG. 4 illustrates how motion vectors for B frames are derived from motion vectors for P frames in accordance with this invention.
Figure 5:
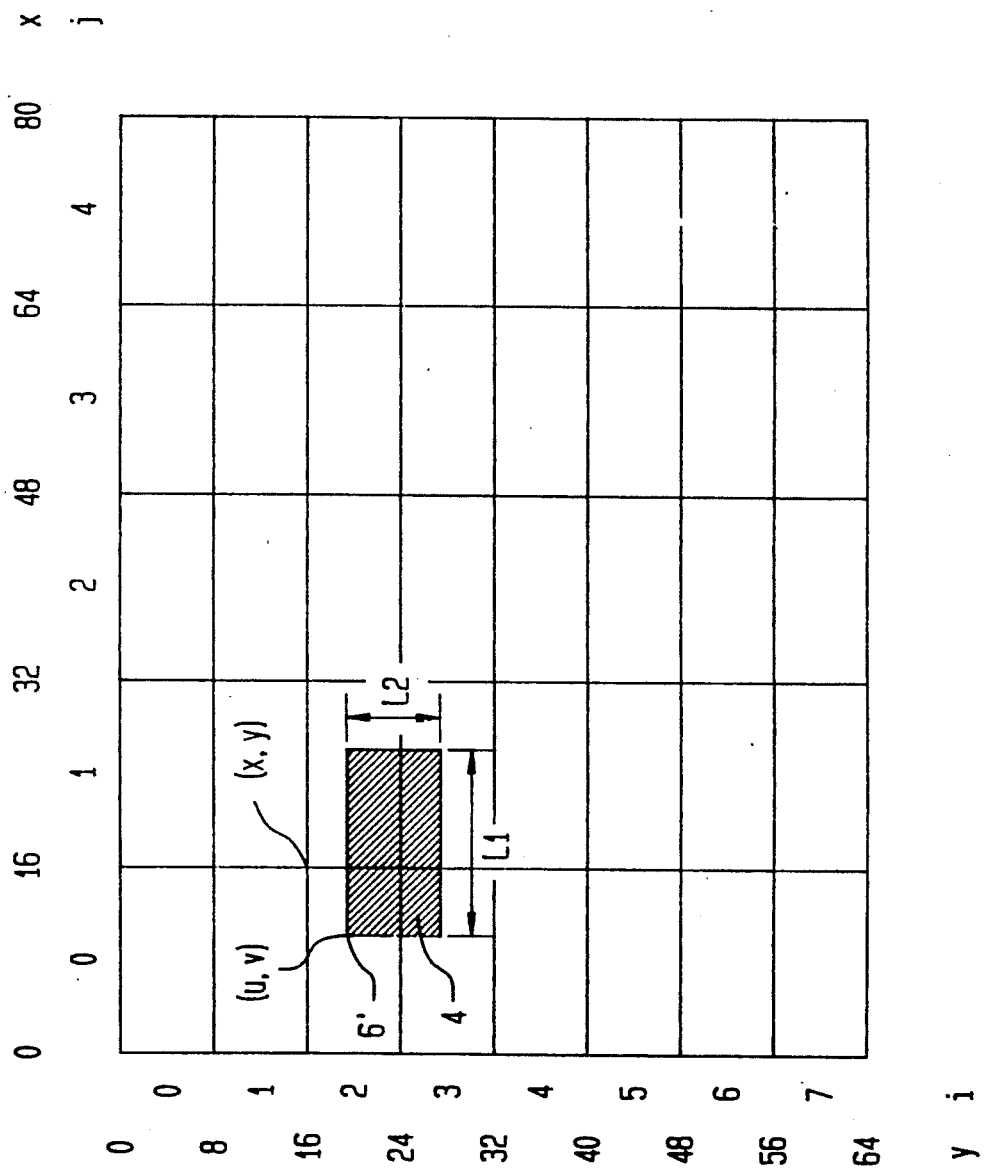
FIG. 5 illustrates the four blocks in a B frame that can be intercepted by the projection of a motion block in the P frame along its motion vector to a previous anchor frame.

Reference is made to FIGS. 4 and 5 for an explanation of the area-overlap method used by this invention to derive the motion vectors for a block in a B frame. In FIG. 4, frames $I_0$, $B_1$, $B_2$ and $P_3$ are shown. They are partitioned into identical rectangular blocks of pixels that are $L_1$ pixels wide and $L_2$ pixels high and located in accordance with i and j coordinates having an origin at the upper left corners of the frames. Within each frame, pixels are identified by x, y coordinates.

In FIG. 4, a motion block at i=0, j=0 of a $P_3$ frame is shown by the shading as being projected toward the $I_0$ frame in a direction parallel to its motion vector 2. The area of intersection of the projection with the $B_1$ frame is shown by a rectangle 4, and the area of intersection of the projection with the $B_2$ frame is shown by a rectangle 5.

A method for determining the area of overlap of the area of intersection 4 with the various blocks of the $B_1$ frame will now be explained by reference to FIGS. 4 and 5. Although any point in a motion block of $P_3$ could be used as a reference, the upper left hand corner 6 is used in this particular example. Its projection is shown as intersecting the $B_1$ frame at 6, in a block at j=0, i=2. Observation will show that the area of intersection 4 can only overlap four blocks in $B_1$, the one intersected by the projection of the corner 6, which is 6', the one to the right, the one below and the one on a diagonal, i.e. those at j=0, i=2; j=1, i=2, j=0, i=3 and j=1, i=3.

The area in pixels of the overlap with each of the four blocks can be determined by the following formula:

$$AO = (L1 - |x - u|)(L2 - |y - v|) = L1\,L2 + |x - u| \cdot |y - v| - L2|x - u| - L1|y - v|$$

where L1 equals the width of a motion block in pixels, L2 the height of a motion block in pixels, u, v are the values of the x, y coordinates in pixels of a reference point having a defined relationship to the projection of a motion block in the P frame onto a B frame, and x, y are the coordinates in pixels of a reference point having the same defined relationship to a B frame motion block.

By way of example, suppose we wish to find the area of overlap of the projection of the motion block in the upper left corner of the $P_3$ frame of FIG. 4 with the motion block at j=1, i=2 of the $B_1$ frame. As shown in FIG. 5, L1=16 pixels and L2=8 pixels. By observation, the width of the overlap is 12 pixels and its height is 6, so that the desired area is 12×6=72 pixels. If the defined relationship is that the reference point is the top left corner of a block, then u=12 and v=18 and x=16 and y=16 so that the area of overlap in accordance with the formula is:

$$AO = [16 - |16 - 12|][8 - |16 - 18|] = [16 - 4][8 - 2] = 12 \times 6 = 72$$

As illustrated by the flow charts of FIGS. 6 through 10 for calculating the areas of overlap AO, the areas of overlap in each of the blocks of a B frame are derived for each motion block in a P frame and the vector for the block in the B frame is derived from the vector of the motion block in the P frame whose projection has the most overlap.

Reference is now made to FIGS. 6 through 10 for a description of a flow chart of a way for determining the motion vectors of a B frame in accordance with the algorithm just described. It is thought that the comments in the various blocks make the chart self-explanatory, but its general operation is as follows. The following terms are used:

T—frame number;
N—(N—1) B frames between anchor frames;
Area Table current best area overlap for each B frame motion block;
Best mv—current best P frame motion vector for each B frame motion block;
d—distance to the previous anchor frame;
(i, j)—location of P and B frame motion blocks. From top left corner, i motion blocks down, j motion blocks to the right; are used as block index in loops;
(iB1, jB1), (iB2, jB2), (iB3, jB3), (iB4, jB4)—location of B frame motion blocks. From top left corner iBk motion blocks down, jBk motion blocks to the right;
(x, y)—pixel coordinates of top left corner of B frame motion blocks;
(tlvP, tlhP) pixel coordinates of top left corner of P-frame motion block in the P-frame;
(u, v)—pixel coordinates of top left corner of P frame motion block projected onto B frame;
k—B frame motion block loop counter; and
AO—area overlap.

Figure 6:
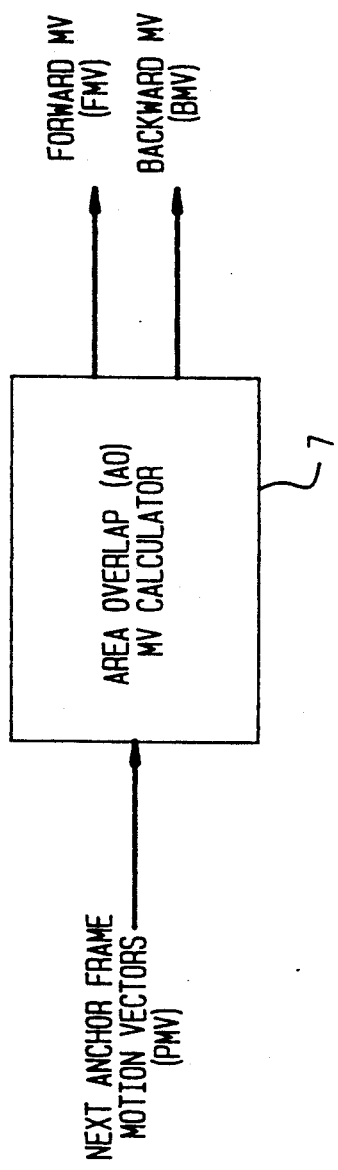
FIG. 6 shows the input and outputs of an area overlap motion vector calculator used in an embodiment of this invention.

In a block 7 of FIG. 6, the motion vectors (PMv) from the next anchor frame to the previous anchor frame are supplied to the calculator, and it supplies, in a manner explained in connection with FIGS. 7 through 10, the forward and backward motion vectors for a B frame.

Figure 7:
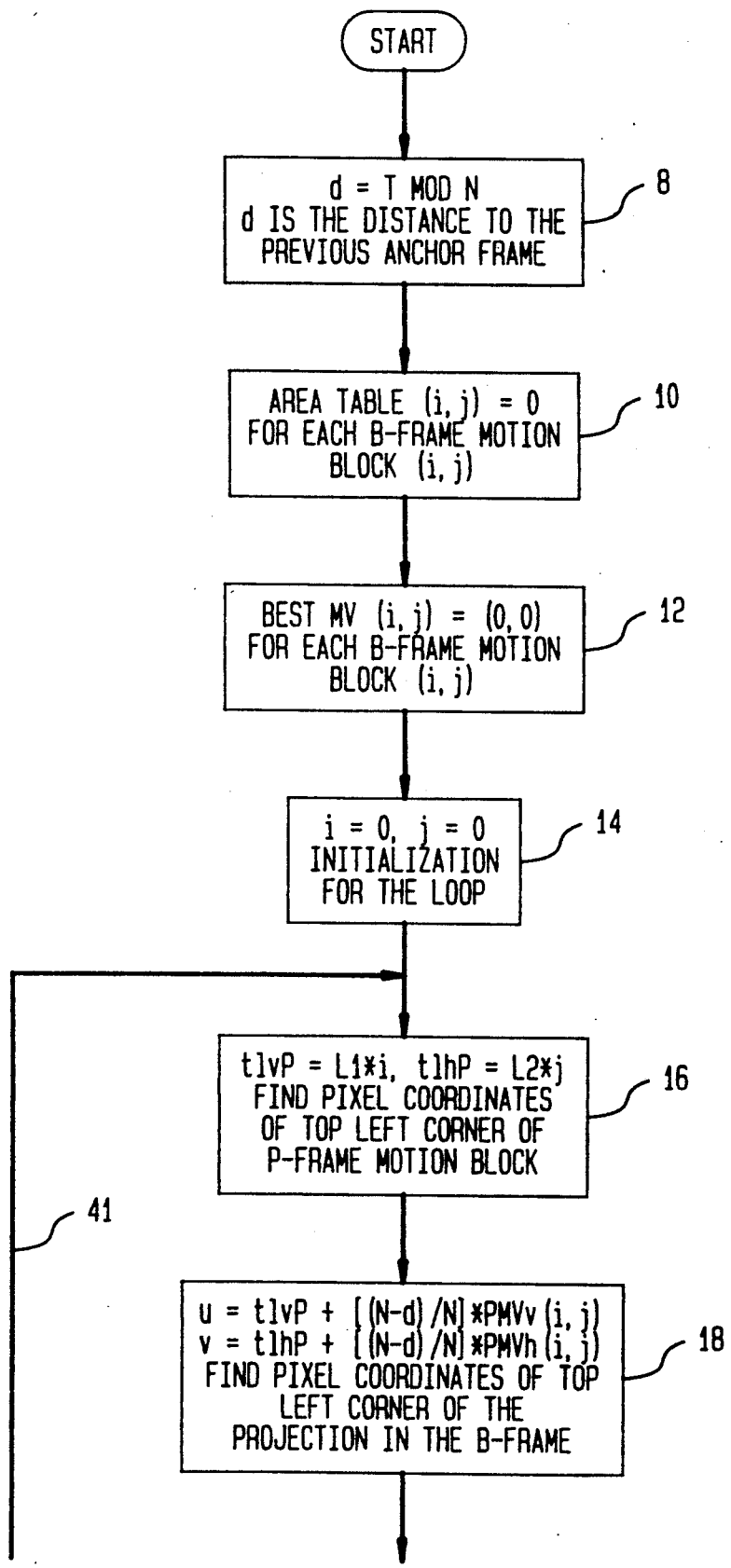
FIGS. 7, 8, 9 and 10 constitute a flow chart for the operation of an area overlap motion vector calculator of this invention using the upper left corner of a motion block in a P frame as a point of reference.
Figure 8:
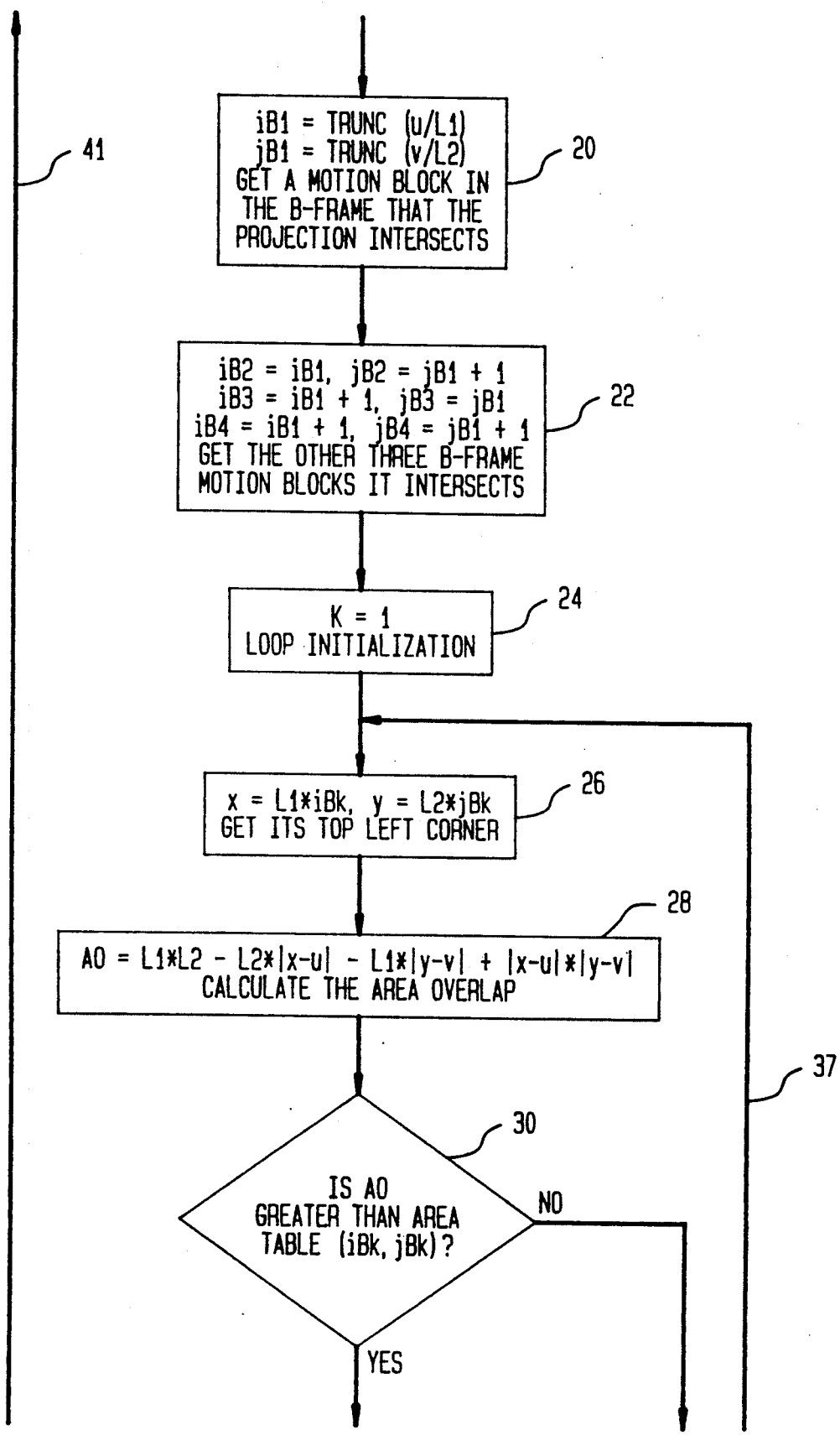
Figure 9:
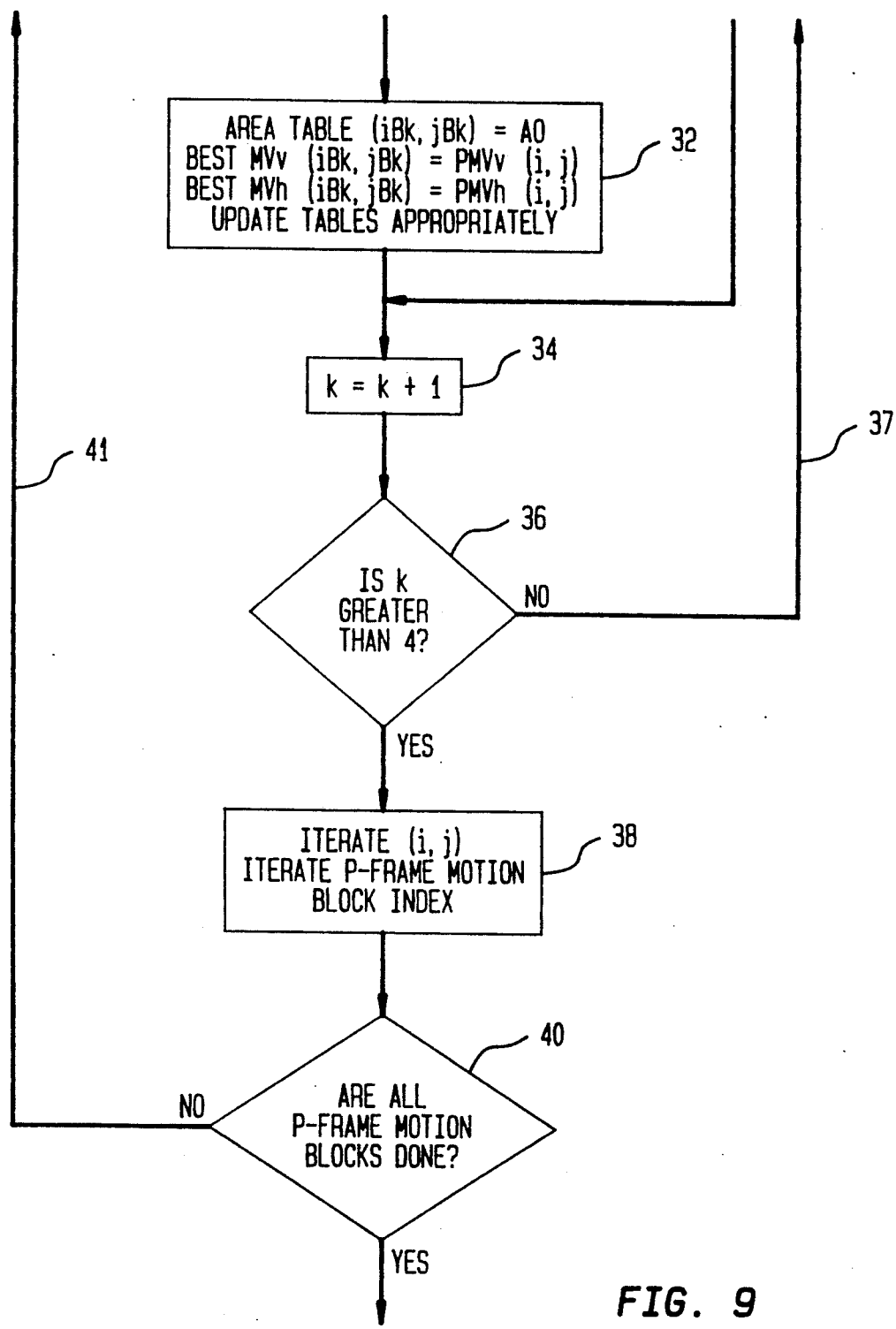
Figure 10:
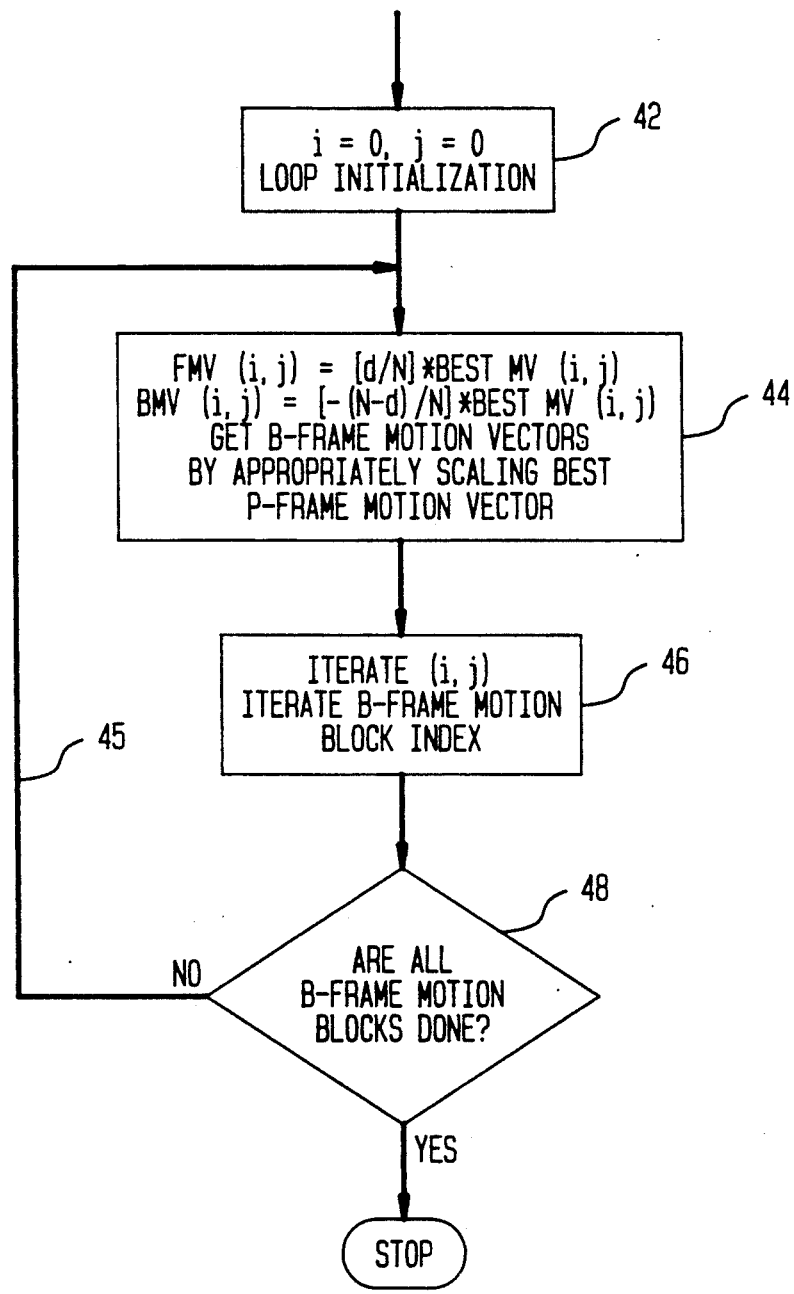

The blocks 8, 10, 12 and 14 of FIG. 7 are for initialization. In block 16, the pixel coordinates of the top left corner of a P frame motion block are found, and using the P frame motion vectors, block 18 locates the coordinates of the top left corner of the projection block onto the B frame of interest. In block 20 of FIG. 8, the block in the B frame through which the projection of the upper left corner of the motion block in the P frame passes is identified, and in block 22 the other three blocks where there may be overlap with the projected motion block in the P frame are identified. In block 24, k is set to 1 and the next time through the loop it will be set at 2.

In block 26, the x and y coordinates in pixels are determined for each of the blocks identified in blocks 20, 22; and in 28, and the formula for AO is applied to each of them. As the AO for each of the four blocks in a B frame is calculated, a decision is made, block 30, as to whether the AO is greater than an AO previously calculated. If it is larger, a block 32 of FIG. 9 updates a table for that B block, and the procedure goes to a block 34 which adds 1 to k. If block 30 indicates that the AO is not larger than what is in the table, the table is not changed, and the procedure goes to the block 34. A block 36 asks whether k is greater than 4. If not, then the procedure loops back to the block 26 as indicated by a line 37.

If k is greater than 4, it means that all four blocks which a projected motion block of a P frame might intersect have been processed. A block 38 then iterates i and j so as go to another motion block in the P frame. A block 40 then checks to see if all P frame motion blocks have been processed. If not, the procedure loops back to the block 16 as indicated by the line 41. If so, i and j are set to 0 in block 42 of FIG. 10 and the procedure is set to derive the forward and backward B frame motion vectors from the selected P frame motion vector.

Then, for each B frame motion block, the vectors from the table are obtained that are for the motion block in a P frame having a projection on that B frame block with the most overlap, block 44. The vectors are then scaled so as to take into account the position of the B frame between two anchor frames. If $B_1$ is the block under consideration, the backward vector would be $-\frac{2}{3}mv_{30}$ the forward vector would be $+\frac{1}{3}mv_{30}$. As this is done for each B frame block, the i and j coordinates are iterated. A block 48 asks if all B frame blocks have been processed. If not, the procedure loops back to the block 44 as indicated by a line 45, but if all B frame blocks have been processed, the calculations are complete until it is desired to obtain the motion vectors for the blocks of another B frame.

Figure 11:
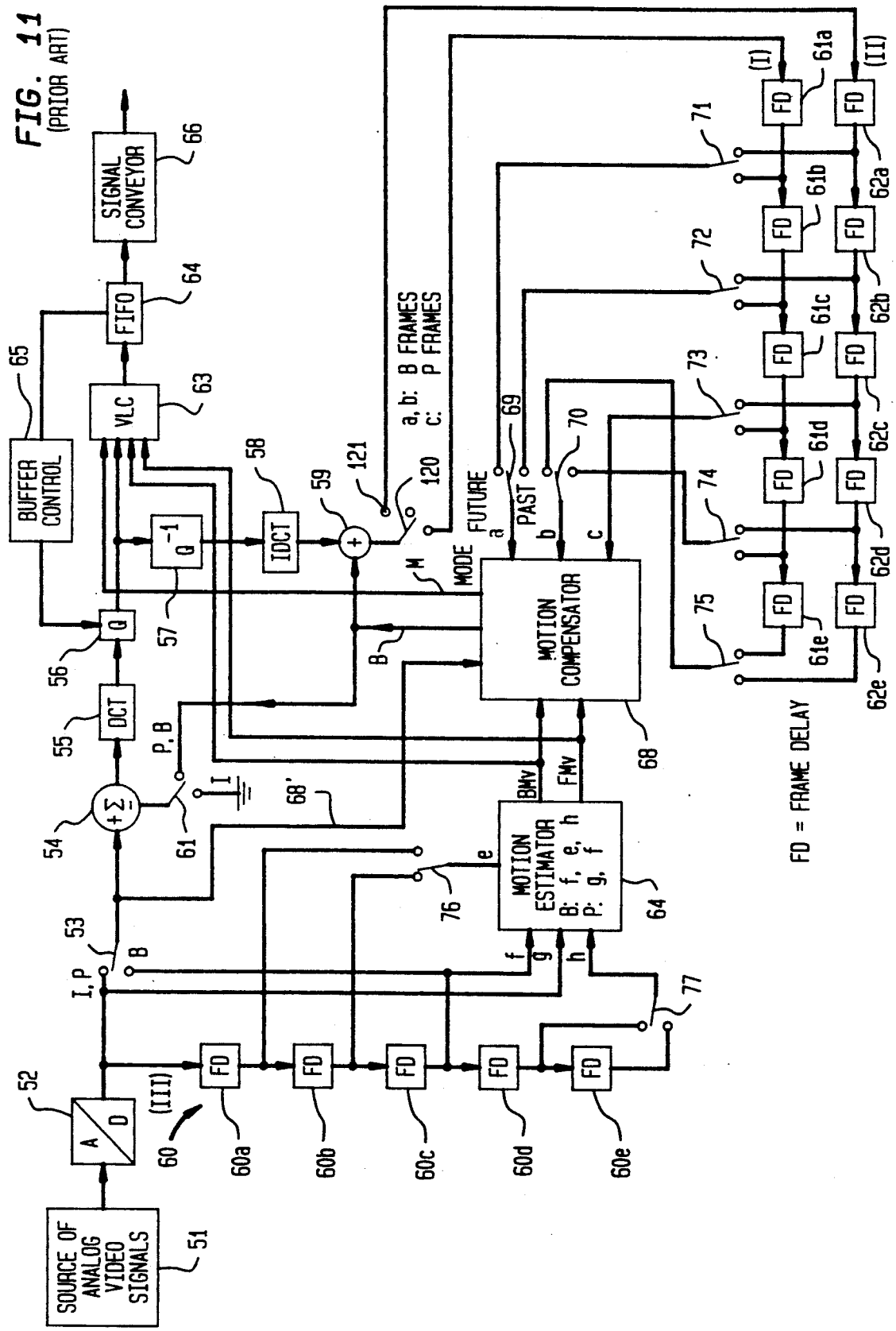
FIG. 11 is a block diagram of an encoder for a system employing independent search, IS.

FIG. 11, prior art, shows a block diagram of an encoder for a system which uses the independent search method previously referred to in which forward and backward vectors are derived for each block in a B frame by a block matching process. Signals from a source 51 are digitized in an A/D device 52 and applied to the I, P terminal of a switch 53. When coding an I frame, the switch 53 is in contact with its I, P terminal so that the signals for this frame are transferred block by block to the positive input of a subtracter 54. Also, the negative input is connected to ground by a switch 61. The blocks of digitized data are transformed block by block into DCT coefficients by a Discrete Cosine Transform processor 55. These coefficients are quantized by a quantizer 56 so as to reduce the resolution of coefficients for higher frequencies.

The quantized coefficients are variable length coded by a variable length coder, VLC, 63, and the resulting bit stream is coupled to a FIFO buffer 64. The output of the FIFO buffer 64 is a bit stream having a constant bit rate and is transmitted to an output channel by a signal conveyor 66. The fullness of the FIFO buffer 64 is examined by a buffer controller 65 that adjusts the step size of the quantizer 56 so as to increase or decrease the bit rate of the signal applied to the VLC 63 and thereby prevent it from overflowing. Thus, an I frame is intracoded so that no reference is made to any other frame. The I frame is recovered, albeit with quantization error, by an inverse quantizer 57 and inverse DCT, IDCT 58 and applied to an adder 59. At this time, the output of the adder 59 is connected via a switch 120 to the input of a series of frame delays 61a–61e.

Note that all digitized frames at the output of the A/D device 52 are applied to a series of frame delays 60a through 60e. The B frames immediately following the I frame just described are applied to the frame delays 60a14 60e, but the switch 53 is input connected terminal B so that the B frames are merely held for future processing, while previous B frames are supplied to terminal B of switch 53 for processing.

The next P frame, $P_3$, for example, is encoded by again placing the switch 53 in contact with its I, P terminal and placing the switch 61 in contact with its P, B terminal. The switch 120 at the output of the adder 59 is connected to a terminal 121 that is connected to the input of a series of frame delays 62a-62e.

Figure 2:
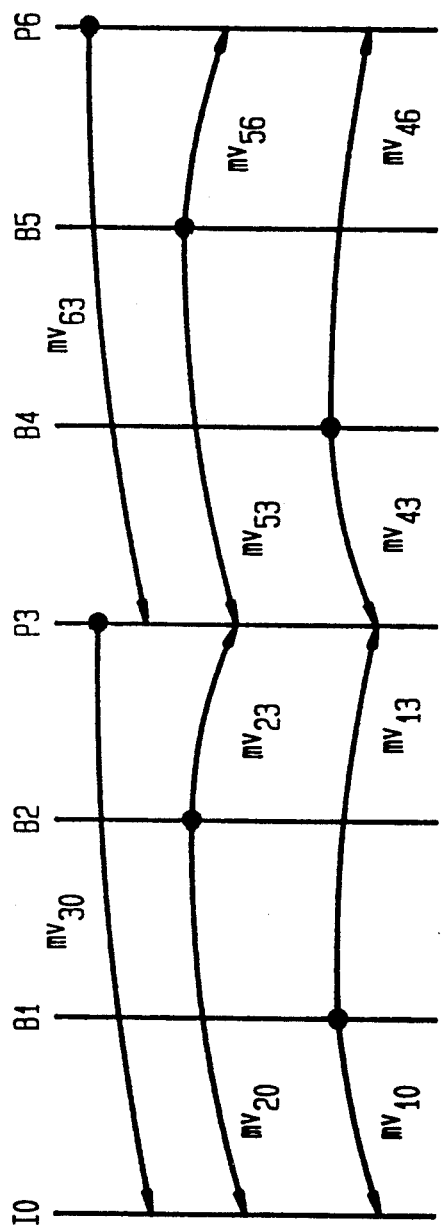
FIG. 2 illustrates the motion vectors used in an IS system.

The input digitized I0 frame is now at the output of the frame delay 60c which is connected to the f input of a motion estimator 67, and the input $P_3$ frame is applied to the g input of the motion estimator 67. In a manner well known to those skilled in the art, the motion estimator 67 derives the motion vectors like $mv_{30}$ of FIG. 2 that indicate for each motion block in $P_3$ where a matching block may be found in I0. These motion vectors appear at the output FMv of the motion estimator 67 and are applied to the VLC 63 for transmission to a decoder and to a motion compensator means 68.

The motion compensator 68 is coupled by a line 68' to the positive input of the adder 54 so as to receive the digitized input data for $P_3$, and a switch 73 connects an input of the compensator 68 to the output of the delay 61c so as to receive the frame I0 that was recovered by the inverse quantizer 57 and the inverse DCT 59. By using the motion vectors from the motion estimator 67, the motion compensator 68 forms a predicted frame for $P_3$ which is supplied to the adder 59 and via a line B and the switch 61 to the negative input of the subtracter 54 wherein it is subtracted from the input data for $P_3$ by the subtracter 54 so as to derive the difference or residue signal.

This residue signal is transformed into DCT coefficients that are quantized in a similar way as the I0 frame mentioned earlier. Also, the operations performed by the VLC 63, the FIFO 64, the inverse quantizer 57 and the inverse DCT 58 are the same as when the I frame was processed. The output of the IDCT 58 represents residue and is added to the predicted $P_3$ frame by the adder 59, and the adder output is stored in a series of frame delays 62a-62e. Note that the processed anchor frames are alternately stored in the frame delays 61a-61e and 62a-62e. Thus, I0 was applied to the delays 61a-61e.

At this point, the encoder has in memory the original data for the I0 frame and a $P_3$ frame that has been derived from the I0 frame in the manner described. At a decoder, the coded I0 frame is decoded and a predicted P frame is derived from it with the aid of the motion vectors like $mv_{30}$. The coded residue signal is decoded and added to the predicted P frame to produce the $P_3$ frame.

In an IS system, the best mode for forming a B frame from the I and P frame on either side of it is determined in the following way. The input $B_1$ frame is now available at the output of the frame delay 60c that is connected to the f input of the motion estimator 67. I0 is at the output of the frame delay 60d and is connected to the input h of the motion estimator by positioning a switch 77, and the input frame $P_3$, which is at the output of the frame delay 60a, is coupled to the input e of the motion estimator 67 by positioning a switch 76. For every motion block in $B_1$, the motion estimator 67 finds a matching block in the previous anchor frame I0 so as to produce a forward motion vector FMv such as $mv_{10}$ of FIG. 2. For every motion block in $B_1$ a matching block is also found in the next anchor frame $P_3$. This results in a backward motion vector BMv such as $mv_{13}$ in FIG. 2.

Figure 12:
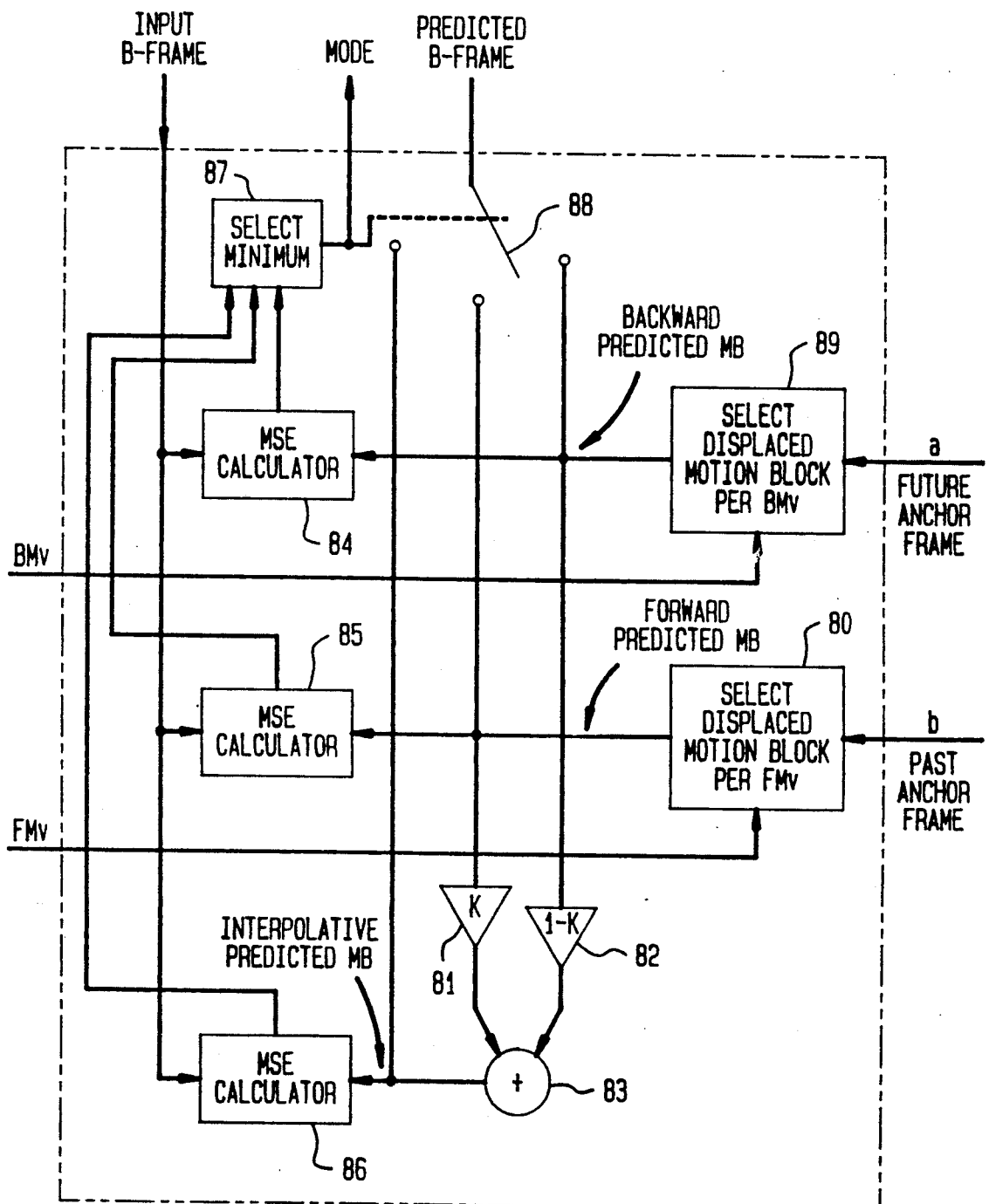
FIG. 12 is a block diagram of means for selecting the mode for predicting B frames and for forming the predicted B frame in an IS system.

One or both of the motion vectors derived as just described may be sent to the VLC 63 for coding based on a decision made by the motion compensator 68 in a manner illustrated in FIG. 12, prior art. The selection made is called a mode, and a signal indicating the mode is sent via a line M to the VLC 63 for encoding. The B frames are not transmitted, but they are reconstructed at a decoder from one or both of the anchor frames by using the motion vectors in accordance with the mode signal. Thus, if the mode signal indicates that the matching block in $P_3$ gives best results, that matching block is used. If the matching block in I0 is best, it is used, and if a combination of blocks produces the best results, the combination is used. This in done on a block by block basis so that different modes may apply to different blocks.

In addition to motion vectors and mode signals, the encoder must encode the difference between a selected matching block or combination of matching blocks and the corresponding block in the B frame as it is supplied by the A/D device 52. This is done by supplying the selected matching block or combination of matching blocks to the negative input of the subtracter 54 via the line B and the switch 61. The differences or residue at the output of the subtracter 54 are then processed by the DCT 55, the quantizer 56, the VLC 63, the FIFO 64 and applied to the signal conveyor 66. There is no need to form a predicted block with the inverse quantizer 57 and the inverse DCT 58 as decoded B frames are not needed by the encoder and therefore need not be formed at the encoder. Therefore, the switch 120 is set on an open terminal.

The manner in which the best mode is selected in an IS system is as follows. Whereas the motion vectors FMv and BMv for a B frame are derived from the actual anchor frames on either side of it, these actual frames are not available at the decoder so that the best mode must be selected on the basis of the anchor frames available at the encoder. Anchor frames substantially identical to those recovered at a decoder were produced at the output of adder 59 and alternatively applied by the switch 120 to the series of frame delays 61a-61e and the frame delays 62a-62e as previously described. Future anchor frames are supplied to an input a of the motion compensator 68 by means of a switch 69 and switches 71 and 72, and past anchor frames by switches 70, 74 and 75 to an input b of the motion compensator 68. By way of example, when the best mode is to be determined for $B_1$, the switch 71 is placed in contact with the output of the frame delay 62a, and the switch 69 is placed in contact with the switch 71 so that the next anchor frame $P_3$, which is at the output of 62a is applied to the a input of the motion compensator 68; the switch 74 is placed in contact with the output of the frame delay 61d, and the switch 70 is placed in contact with the switch 74 so that the previous anchor frame I0, which is at the output of the frame delay 61d is applied to the b input. Also, switches 77 and 76 are appropriately set so as to choose input frames I0 and $P_3$ respectively.

Referring to FIG. 12, the FMv and BMv motion vectors supplied by the motion estimator 67 are used to select the appropriate forward and backward predicted motion blocks from the past and future anchor frames by selection blocks 80 and 89 respectively. These motion blocks are respectively supplied to Mean Square Error (MSE) calculators 85 and 84. The other input to each of these calculators is the input B frame motion block. Additionally, a third motion block called an "interpolative predicted motion block" may be generated by performing a weighted average on the forward and backward predicted motion blocks. For example, an amplifier 81 may multiply the output of the block from the past anchor frame by K and the one from the future anchor frame by $1-K$. In the case of $B_1$, $K=\frac{2}{3}$. The interpolative predicted motion block is supplied to a third MSE calculator stage 86.

Each of these MSE calculators calculates the mean square error between the input motion block and the predicted or matching motion block. These errors are supplied to a selector 87 which determines the minimum of the three errors and controls a switch 88 so as to choose the predicted motion block which resulted in the least error. This chosen predicted motion block appears on the lead B of the motion compensator 68 of FIG. 11 and is supplied through the switch 61 to subtracter 54. Also, mode information as to which predicted block is selected is supplied by the selector 87 and by a lead M to the VLC 63 for coding and transmission to the receiver. Specifically, the mode information tells the receiver which of the three prediction modes was used in the prediction of each motion block when frame $B_1$ was coded.

Figure 13:
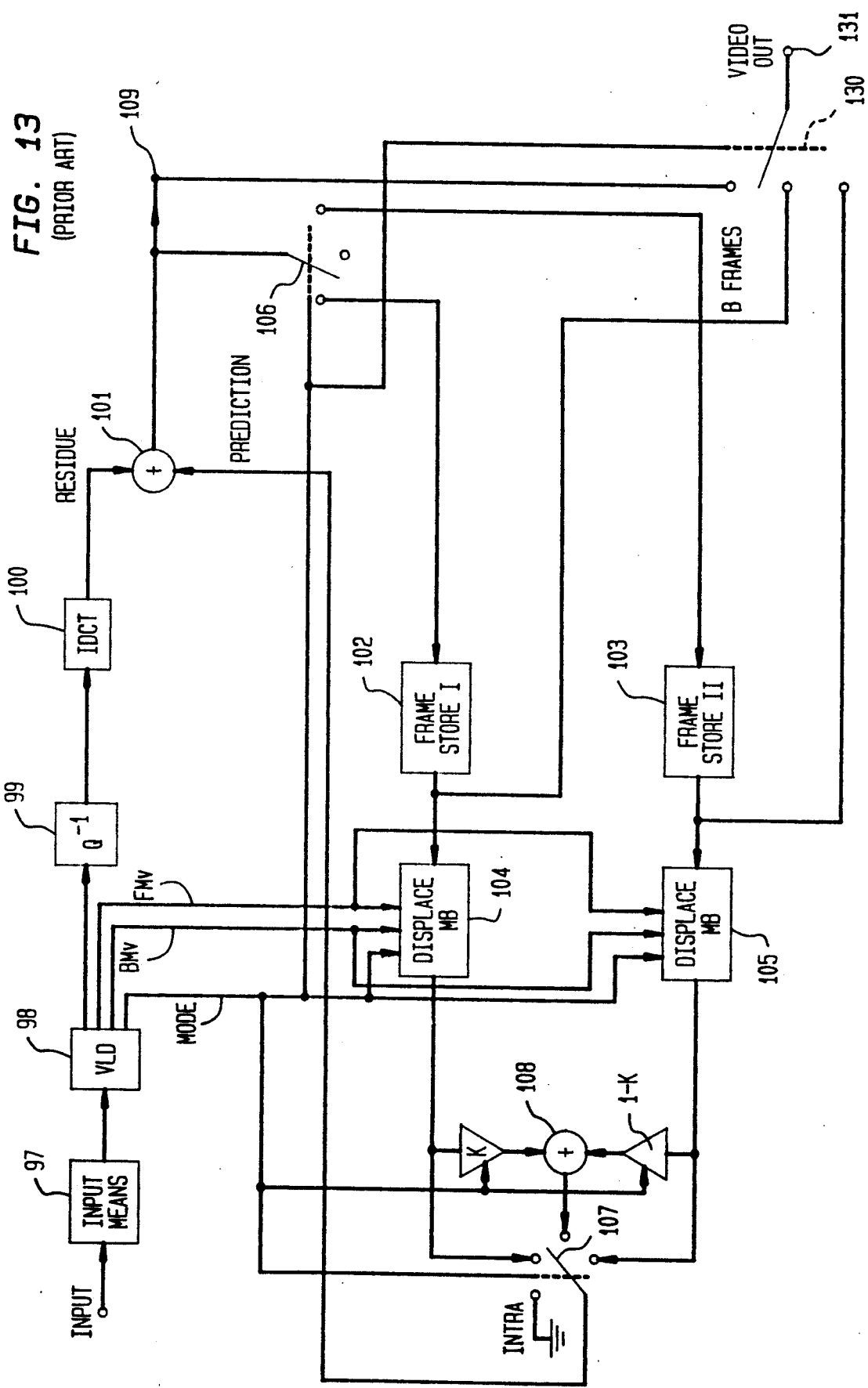
FIG. 13 is a block diagram of the decoder for an IS system.

FIG. 13, prior art, shows the block diagram of the decoder for the independent search method IS. An input means 97 receives the bit rate reduced signal and supplies it to a variable length decoder (VLD) 98. The VLD separates the block data into essentially four types of information: video data in the form of quantized DCT coefficients, forward motion vectors FMv, backward motion vectors BMv, and mode information. The quantized DCT coefficients are dequantized by inverse quantizer 99 and supplied to a IDCT 100 which transforms them into residue pixels to be added to the prediction information which will be generated in the following manner. Note that the prediction information is absent for intra-frames (zero pixels). The prediction for P frames is obtained as follows. One of the two frame stores 102 and 103 contains the previous anchor frame which is to be used in generating the prediction. Using the forward motion vector information, the appropriate motion block is chosen from the previous anchor frame. After passing through switch 107, it is supplied to an adder 101 where it is added to the residue signal to form the P frame at a terminal 109. Just as in the encoder, a switch 106 is operated so as to store received anchor frames alternately in frame stores I and II, but received B frames are not stored in either frame store.

When B frames are to be predicted, the mode information instructs the displacement blocks 104 and 105 as well as switch 107 as to the type of prediction to be used (i.e. forward, backward, or interpolative). Using this information as well as the appropriate motion vectors that go along with the mode information, the proper motion block or blocks are chosen from one or both frame stores 102 and 103. Either the forward or backward or interpolative predicted motion block is supplied through the switch 107 to the adder 101. An adder 108 performs the weighted average of the forward and backward motion blocks as required for interpolative prediction. Frame stores I and II each have taps for a delay of 1, 2, 3, 4 or 5 frames in a manner similar to frame delays 61 and 62 in the encoder. The prediction is passed to the adder 101 where it is added to the residue signal to form the reconstructed B frames at the terminal 109.

Figure 18:
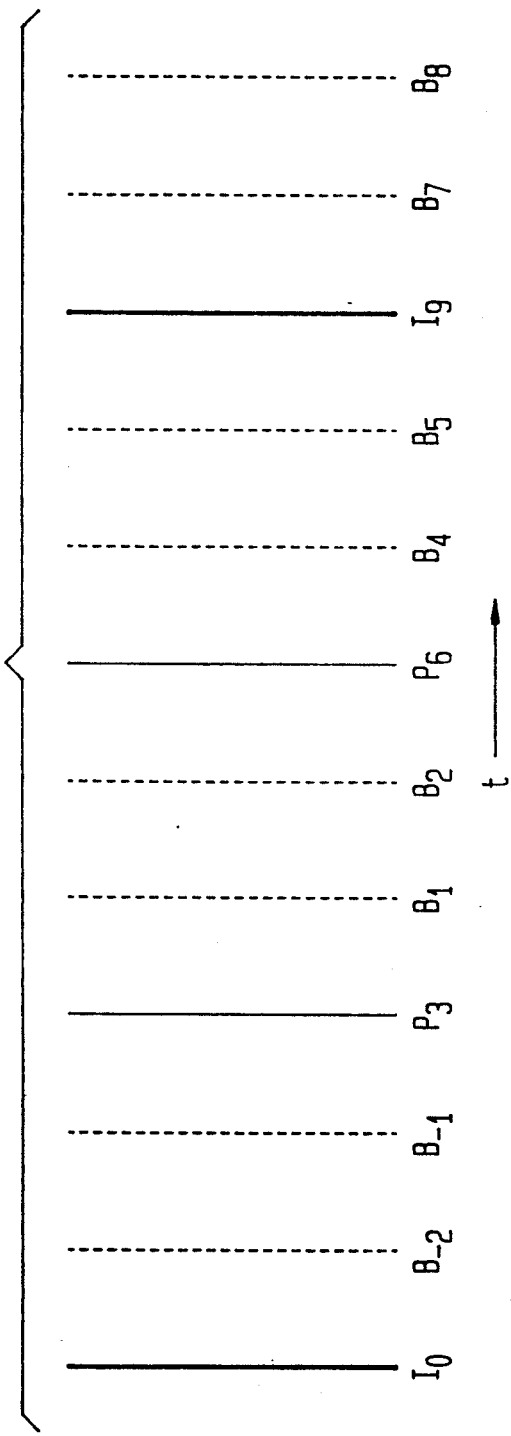
FIG. 18 illustrates the order in which frames are received and processed at the decoder.
Figure 19:
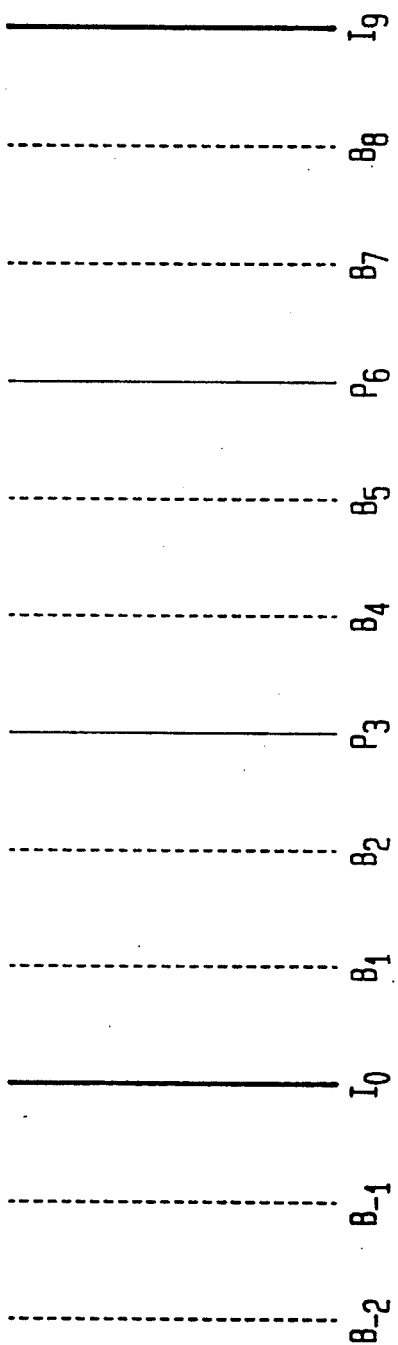
FIG. 19 illustrates the order in which frames are output from the decoder to image reproduction means.

The reconstructed frames will appear at terminal 109 in decoder processing order, FIG. 18. Switch 130 puts the frames back into display order as shown in FIG. 19. When a reconstructed B frame occurs at terminal 109 switch 130 is set so as to supply it immediately to video output terminal 131. When reconstructed anchor frame occurs at terminal 109, switch 106 is set so as to route it to one of the frame stores; and switch 130 is set as to supply the anchor frame in the other frame store to the video output terminal 131.

For example, if frame I0 is in frame store I, and $P_3$ is in frame store II, then $B_1$ is the next frame to be processed as shown in FIG. 18. It is immediately sent out. Similarly, $B_2$ is immediately sent out. The next frame to be processed is $P_6$. It is stored in frame store I while $P_3$ in frame store II is sent out.

Area Overlap Method (AO)

The Area Overlap method of this invention differs from the Independent Search method mainly in the way that the prediction of B frames is done. The AO method uses P frame motion vectors such as $mv_{30}$ for predicting B frame motion blocks in the following way. In this discussion, reference is made to the use of motion vectors for frame $P_3$ (with respect to I0) for the purpose of predicting $B_1$ and $B_2$.

Figure 1:
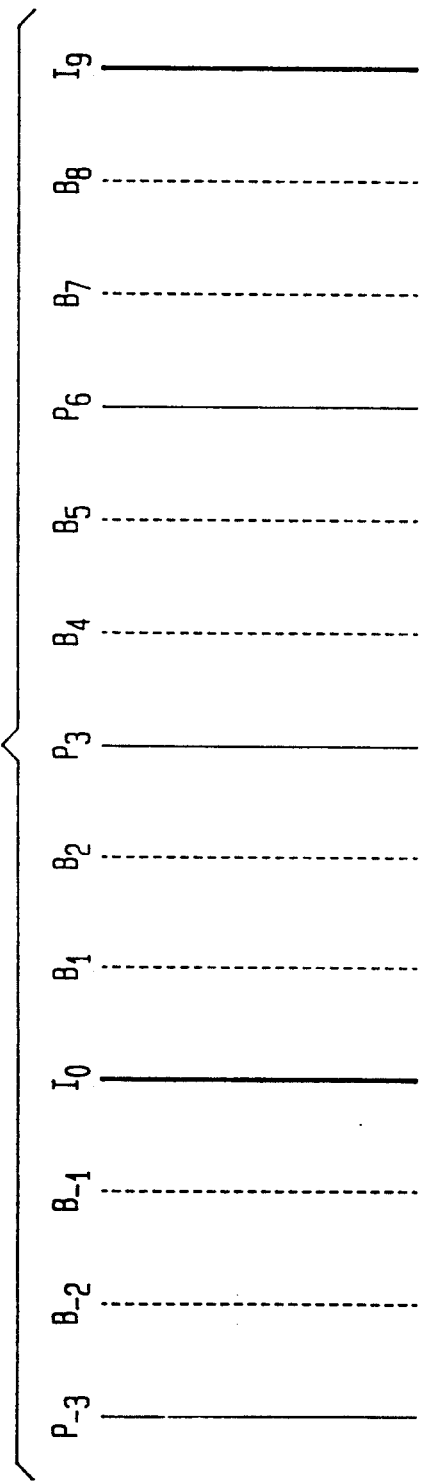
FIG. 1 illustrates the I, B and P frames used in a IS system.
Figure 3:
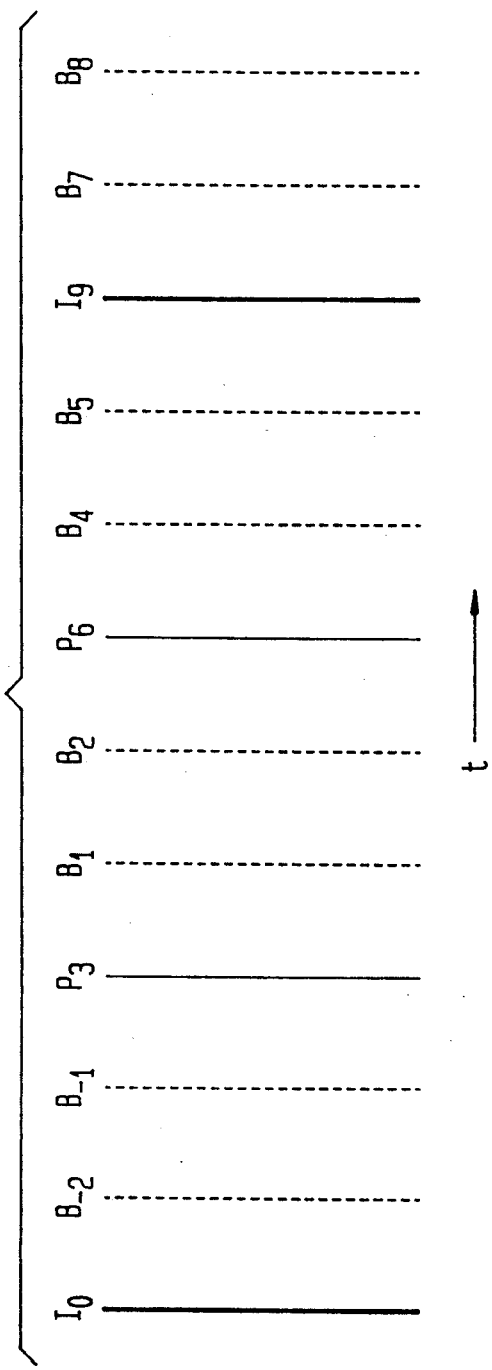
FIG. 3 illustrates the order in which the frames are processed in an IS system.
Figure 14:
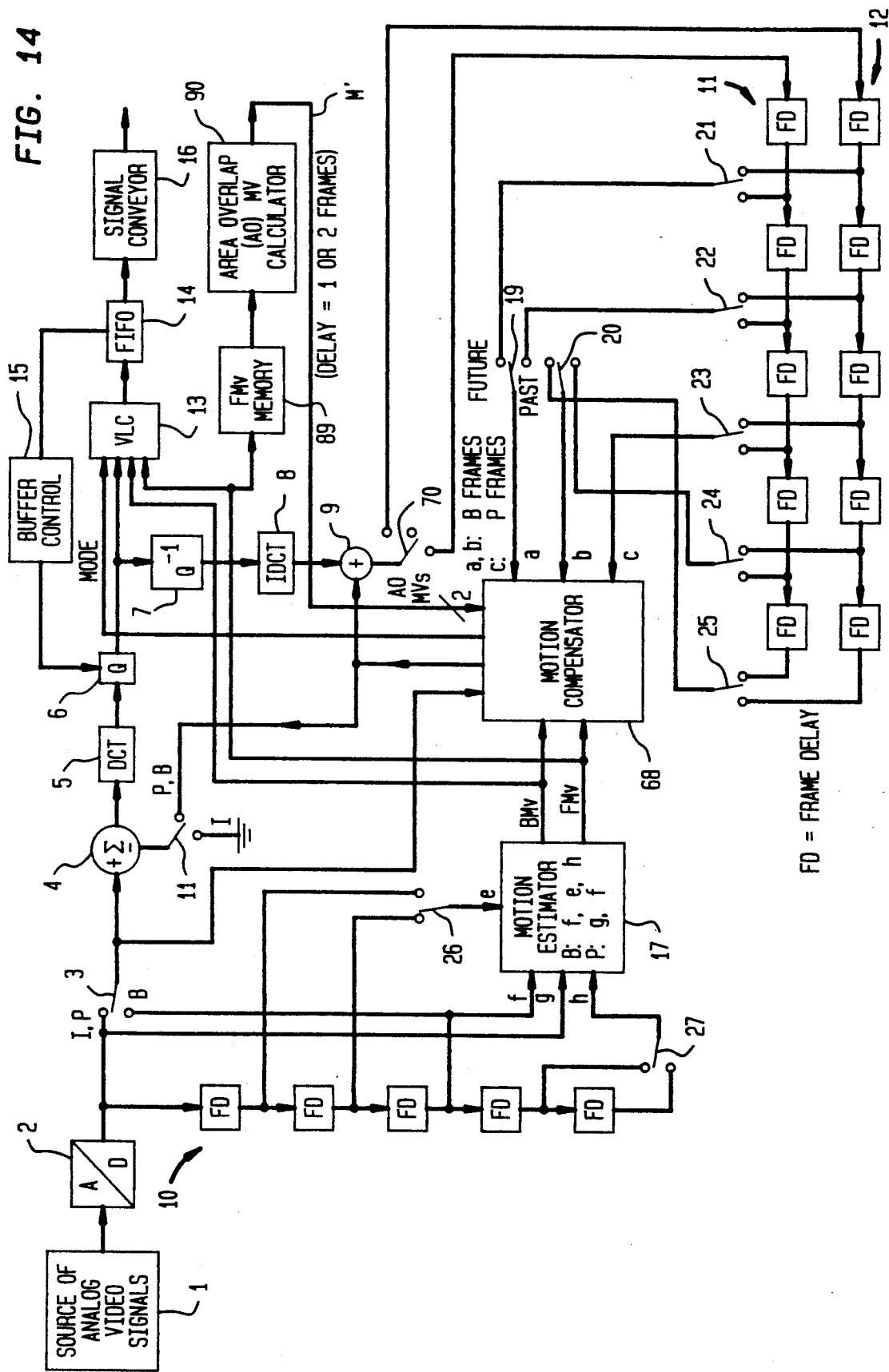
FIG. 14 is a block diagram of an encoder using the area overlap method of this invention for determining motion vectors for predicted blocks in B frames.

FIG. 14 is a block diagram for an encoder incorporating this invention. Those components corresponding to components in FIG. 11 are designated in the same way. Forward motion vectors for $P_3$, such as $mv_{30}$, are stored in a memory 89 for a period (delay) of one or two frames as required by frames $B_1$ and $B_2$ respectively (see FIG. 3). The stored motion vectors are supplied by the Fmv Memory 89 to an Area Overlap Motion Vector Calculator 90 where forward and backward motion vectors AO FMv and AO BMv are calculated for B frame motion blocks in a manner described by reference to FIGS. 4 through 10. As previously explained, a backward motion vector for a $B_1$ block= $-\frac{2}{3}$ of motion vector $mv_{30}$, and the forward motion vector is $\frac{1}{3}$ $mv_{30}$. These motion vectors are supplied to the motion compensator 68 via a lead M'.

Figure 15:
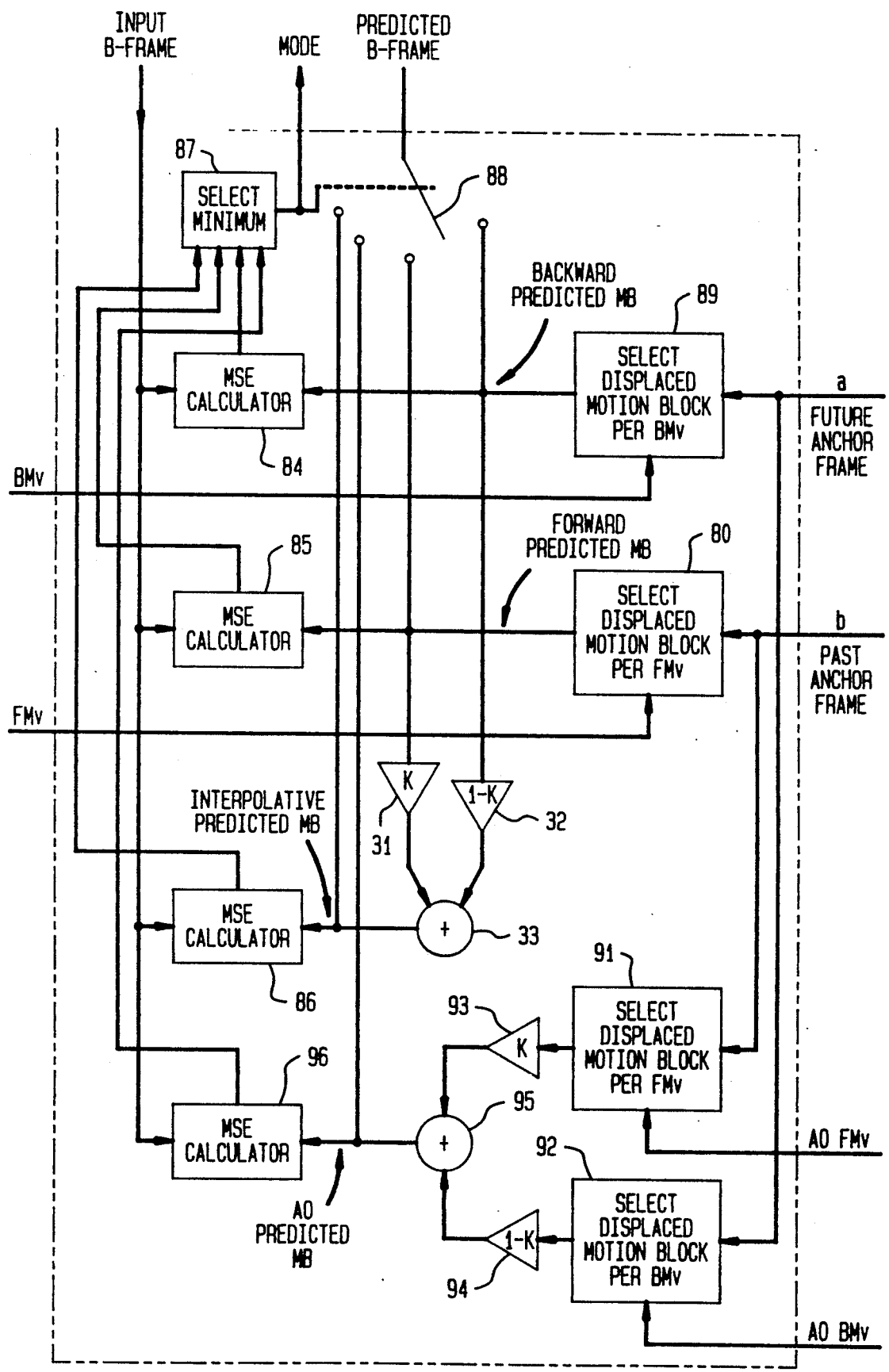
FIG. 15 is a block diagram of one means for selecting the mode for predicting B frames and for forming the predicted B frames.
Figure 16:
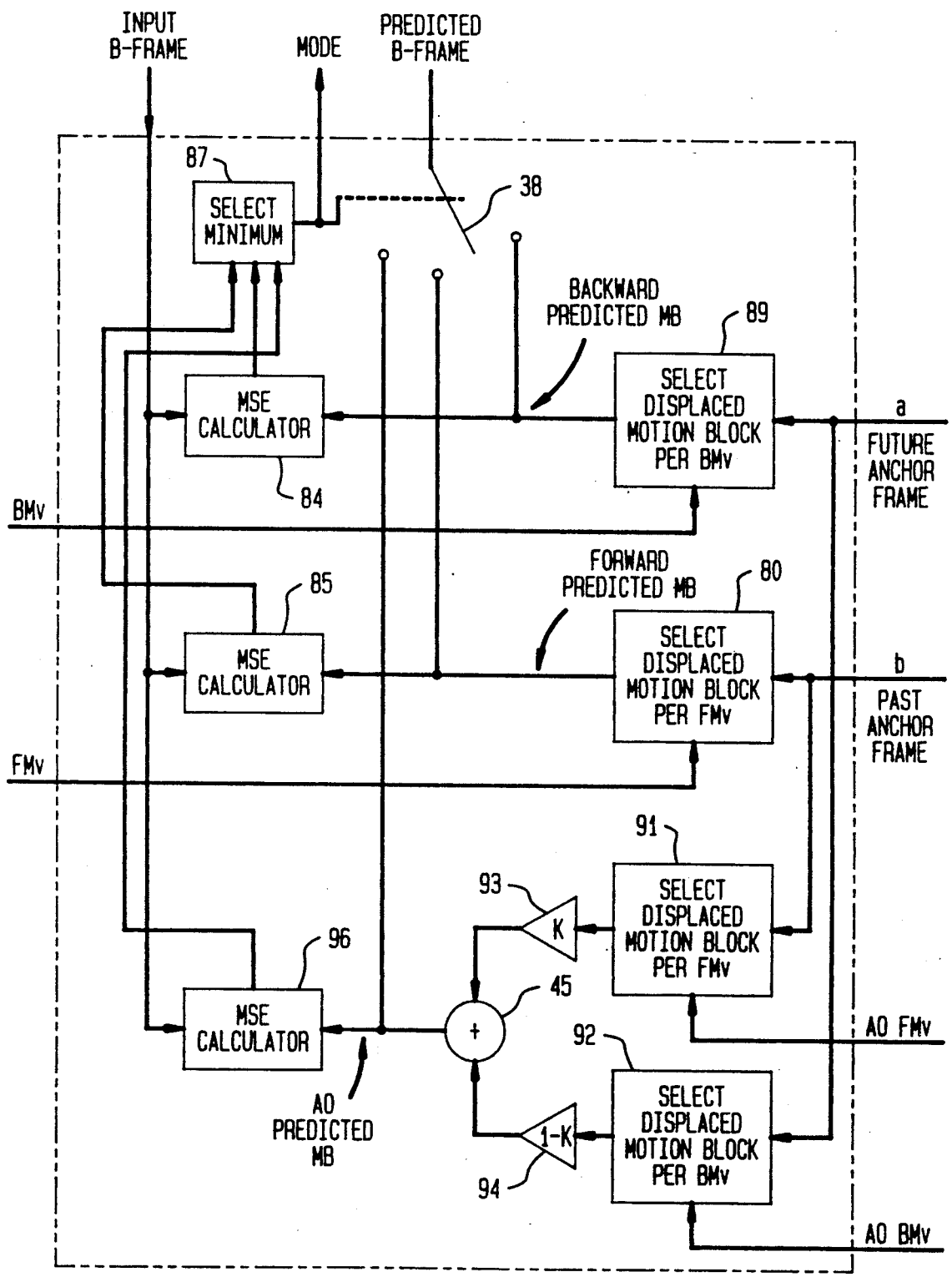
FIG. 16 is a block diagram of a second means for selecting the mode for predicting B frames and for forming the predicted B frames.

Motion compensation may be done in a number of ways. One way is shown in FIG. 15; another way is shown in FIG. 16. Corresponding components in these figures and FIG. 12 are identified in the same way. In FIG. 15 the AO motion vectors are supplied to displacement blocks 91 and 92 that are capable of doing spatial interpolation at subpixel locations. A weighted average is performed on the outputs of the selected displaced motion blocks by multipliers 93 and 94 and an adder 95 to yield an AO predicted motion block at the output of the adder. This becomes a fourth candidate to be chosen by the switch 88. The calculations of mean square error are made in an MSE calculator 96, and the results are supplied to minimum selector 87 in a manner previously explained in connection with FIG. 12 We now have four possible predicted motion blocks, and once again the selector 87 instructs switch 88 to select the predicted motion block which yields the least error. The information as to which of these modes yields the least error is also sent to the receiver as before. FIG. 16 is an alternative method for motion compensation. It differs from FIG. 15 only in that the AO predicted motion block has replaced the interpolative predicted motion block as a candidate, whereas in FIG. 16 the AO predicted motion block was added to the list of candidates to be checked.

Whereas the AO motion vectors, AO FMv and AO BMv, derived in accordance with this invention have been shown as being used in a bidirectional mode, they may also be used in unidirectional modes in a manner similar to the FMv and BMv vectors of the IS system.

Figure 17:
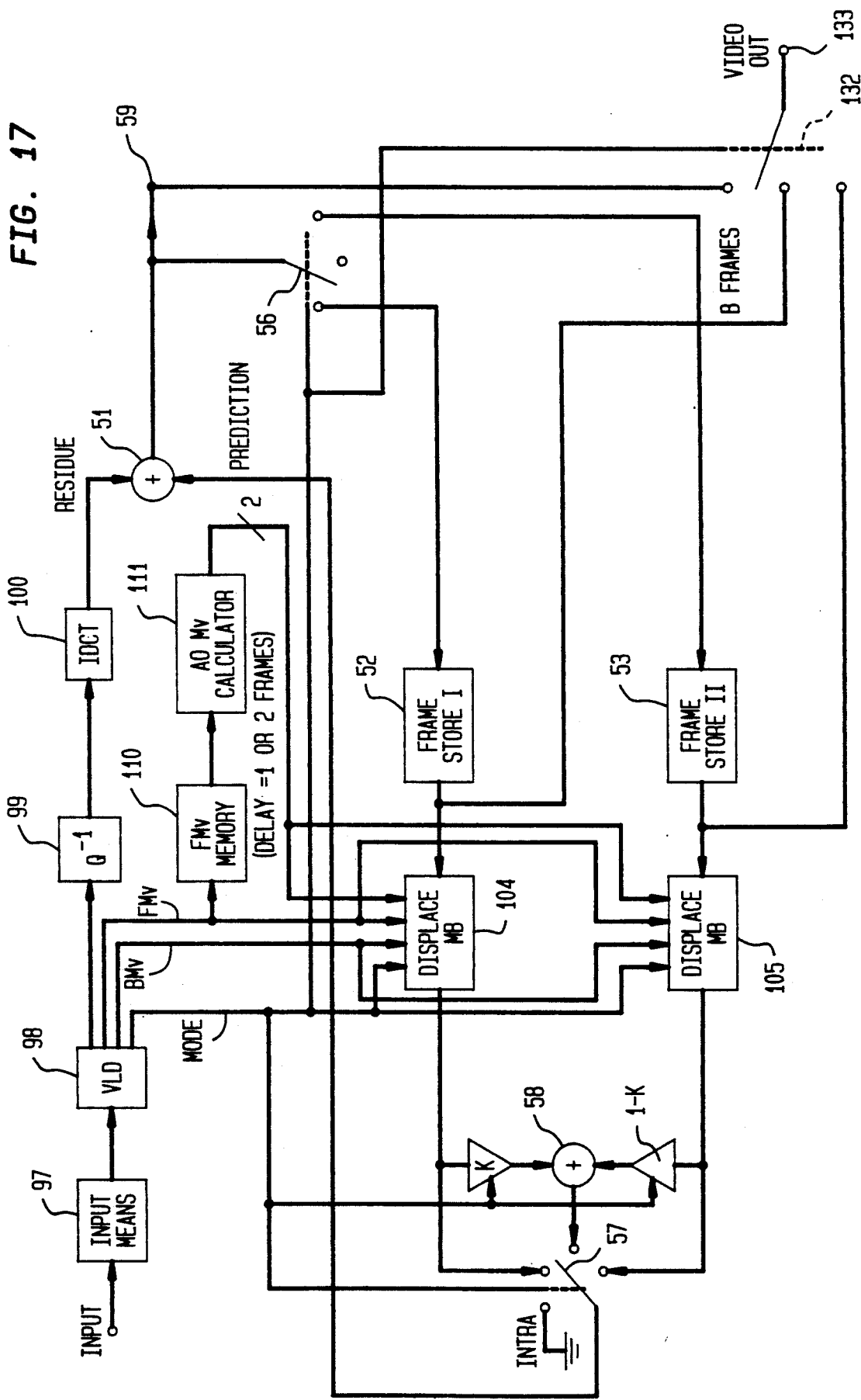
FIG. 17 is a block diagram of a decoder for a system using the area overlap method of this invention for determining motion vectors.

A decoder for the AO method is shown in FIG. 17 in which components corresponding to those of FIG. 13 are designated in the same way. In view of the fact that motion vectors for B frames can also be derived in accordance with this invention from motion vectors for an anchor frame that is referenced to a previous anchor frame, blocks 110 and 111 are used by the decoder for this purpose. These are identical to blocks 89 and 90 in FIG. 14. The mode information instructs the displacement blocks 104 and 105 as well as switch 107 as to the prediction mode to be used for B frame motion blocks. Otherwise, the operation of this decoder is identical to that of the decoder for the IS method.

REFERENCES

[1] S. M. E. Group, *MPEG Video Simulation Model Three* (SM3). International Organization for Standardization, July 1990.

[2] D.S. R. Center, NBC, N. A. Philips, and T. C. Electronics, *Advanced Digital Television System Description*. The Advanced Television Research Consortium, February 1991.

[3] A. Puri and R. Aravind, "On comparing motion-interpolation structures for video coding," in *SPIE Visual Communications and Image Processing*, pp. 1560–1571, 1990.

[4] A. Puri, R. Aravind, B. G. Haskell and R. Leonardi, "Video Coding with Motion-Compensated Interpolation for CD-ROM Applications," in *Signal Processing: Image Communication*, pp. 127–144, August 1990.

[5] A. Nagata, I. Inove, A. Tanaka and N. Takeguchi, "Moving Picture Coding System for Digital Storage Media Using Hybrid Coding," in *Signal Processing: Image Communication*, pp. 109–116, August 1990.

What is claimed:

1. In a differential pulse code modulation transmission system utilizing bidirectional motion estimation in the transmission of frames of video information, apparatus for deriving bidirectional frame motion vectors for bidirectionally-predicted frames, B frames, between anchor frames comprising:
means for encoding anchor frames including intraframes I and predicted frames P, said anchor frames having a plurality of B frames between them;
means for partitioning the anchor frames and B frames into a plurality of identical blocks;
means for providing motion vectors for each block in an anchor frame that identify the position of a matching block in a previous anchor frame;
means for defining the area of intersection of the projection of each motion block in an anchor frame along its motion vector with a B frame; and
means for deriving motion vectors for a block in a B frame from the motion vector of a block in an anchor frame whose projection overlaps it the most.

2. In a differential pulse code modulation transmission system utilizing bidirectional motion estimation in the transmission of frames of video information, apparatus for deriving bidirectional frame motion vectors for bidirectionally-predicted frames, B frames, between anchor frames comprising:
means for encoding anchor frames including intraframes I and predicted frames P, said anchor frames having a plurality of B frames between them;
means for partitioning the anchor frames and B frames into a plurality of identical blocks;
means for providing motion vectors for each block in an anchor frame that identify the position of a matching block in a previous anchor frame;
means for defining the area of intersection of the projection of each motion block in an anchor frame along its motion vector with a B frame;
means for determining for each block in a B frame the block in an anchor frame whose area of intersection overlaps it the most; and
means for deriving motion vectors for each block in a B frame from the motion vector for the last mentioned block in an anchor frame.

3. Apparatus as set forth in claim 2 wherein said means for defining said area of intersection comprises:
identifying a reference point in a block in said anchor frame having a given relative position in said block;
locating a first point having the same position in said B frame as said reference point has in said anchor frame;
locating a second point in said B frame that is displaced from said first point by a fraction of the motion vector for said block in said anchor frame, the numerator of said fraction being the number of frame intervals between said B frame and said anchor frame and the denominator of said fraction being the number of frames intervals between adjacent anchor frames; and
the area of intersection with said B frame having the same relationship to said second point as the block in said anchor frame has to said first point.

4. Apparatus as set forth in claim 3 wherein said reference point is at a corner of said block in said anchor frame.

5. Apparatus as set forth in claim 3 wherein an area of intersection of the projection of a block in said anchor frame has an overlap, AO, with a block in said B frame that is defined by the following $$L_1L_2 + |x-u||y-v| - L_2|x-u| - L_1|y-v|$$

wherein
L1 is the dimension of a block as measured along a first direction from said given corner that is parallel to one edge of a frame;
L2 is the dimension of a block as measured along a second direction from said given corner that is orthogonal to said first direction;
x and y are the coordinates along said first and second directions respectively of a point having a given relationship with respect to the block in the B frame; and
u, v are the coordinates along said first and second directions respectively of a point having said given relationship with respect to the intersection of the projection of said block in said anchor frame.

6. An encoder for a differential pulse code modulation system comprising:

means for deriving motion vectors for motion blocks of an anchor frame that are referenced to a previous anchor frame;

means for deriving first sets of forward and backward motion vectors for motion blocks of bidirectionally-predicted frames, B frames, that are respectively referenced to the next and previous anchor frames, the first sets of motion vectors being derived by a block matching process;

means for deriving second sets of forward and backward motion vectors for blocks in B frames that are respectively referenced to the next and previous anchor frames, the second sets of motion vectors being derived from the motion vectors for the motion blocks of an anchor frame that are referenced to the previous anchor frame;

means for making respective comparisons of blocks in anchor frames that are indicated for each motion block of a B frame by the forward motion vectors of the first sets, the backward motion vectors of the first sets and the averages of the blocks so indicated with the input blocks of the B frame so as to derive representations of the respective differences;

means for comparing the average of the blocks in anchor frames that are indicated for each motion block of B frame by the forward and backward motion vectors of the second sets so as to derive representation of the respective differences; and means for deriving a mode signal for each motion block of a B frame indicating the set of motion vectors containing the motion vector associated with the smallest difference.

7. An encoder as set forth in claim 6, wherein said means for deriving second sets of forward and backward motion vectors for blocks in B frames that are respectively referenced to the next and previous anchor frames comprises:

means for partitioning the anchor frames and B frames into a plurality of identical blocks;

means for defining the area of intersection of the projection of each motion block in an anchor frame along its motion vector with a B frames;

means for determining for each block in a B frame the block in an anchor frame whose area of intersection overlaps it the most; and means for deriving motion vectors for each block in a B frame from the motion vector for the last mentioned block in an anchor frame.

8. A decoder for a differential pulse code modulation system comprising:

means for deriving successive anchor frames from received encoded signals;

means for storing said anchor frames;

means for receiving first sets of forward and backward motion vectors for the motion blocks of bidirectionally-predicted frames, B frames;

means for receiving motion vectors for motion blocks in an anchor frame that are referenced to the previous anchor frame;

means for deriving from said last mentioned motion vectors second sets of forward and backward motion vectors for the motion blocks of a B frame; and means for selecting the blocks of a predicted frame from the blocks of anchor frames in accordance with motion vectors from a set of motion vectors that is indicated by a mode signal.

9. A decoder as set forth in claim 8 wherein said means for deriving said second sets of forward and backward motion vectors for the motion blocks of a B frame comprises:

means for partitioning the anchor frames and B frames into a plurality of identical blocks;

means for defining the area of intersection of the projection of each motion block in an anchor frame along its motion vector with a B frame;

means for determining for each block in a B frame the block in an anchor frame whose area of intersection overlaps it the most; and means for deriving motion vectors for each block in a B frame from the motion vector for the last mentioned block in an anchor frame.

* * * * *